(12) United States Patent
Forney et al.

(10) Patent No.: US 7,925,979 B2
(45) Date of Patent: Apr. 12, 2011

(54) EXTENSIBLE MANUFACTURING/PROCESS CONTROL INFORMATION PORTAL SERVER

(75) Inventors: Paul W. Forney, Laguna Hills, CA (US); Rashesh Mody, San Clemente, CA (US); Dave Tran, Las Flores, CA (US); Pramod Thazichayil, Tustin, CA (US); Vijay Anand, Irvine, CA (US); Kimson Q. Nguyen, Costa Mesa, CA (US)

(73) Assignee: Invensys Systems, Inc., Foxboro, MA (US)

( * ) Notice: Subject to any disclaimer, the term of this patent is extended or adjusted under 35 U.S.C. 154(b) by 1194 days.

(21) Appl. No.: 09/955,473

(22) Filed: Sep. 17, 2001

(65) Prior Publication Data

US 2002/0067370 A1 Jun. 6, 2002

Related U.S. Application Data

(60) Provisional application No. 60/232,733, filed on Sep. 15, 2000.

(51) Int. Cl.
*G06F 3/00* (2006.01)
(52) U.S. Cl. ........ 715/733; 715/744; 715/745; 715/746; 715/747; 715/780
(58) Field of Classification Search .................. 345/733, 345/740, 744, 745, 746, 747, 780; 707/102
See application file for complete search history.

(56) References Cited

U.S. PATENT DOCUMENTS

| | | | |
|---|---|---|---|
| 5,768,133 A | 6/1998 | Chen et al. | |
| 5,768,133 A * | 6/1998 | Chen et al. | 700/95 |
| 5,940,504 A | 8/1999 | Griswold | |
| 5,970,490 A | 10/1999 | Morgenstern | |
| 6,029,145 A | 2/2000 | Barritz et al. | |
| 6,038,668 A | 3/2000 | Chipman et al. | |
| 6,073,055 A | 6/2000 | Jahn et al. | |
| 6,119,149 A | 9/2000 | Notani | |
| 6,167,383 A | 12/2000 | Henson | |
| 6,327,628 B1 * | 12/2001 | Anuff et al. | 719/311 |
| 6,571,140 B1 * | 5/2003 | Wewalaarachchi et al. | 700/83 |
| 6,990,653 B1 * | 1/2006 | Burd et al. | 717/108 |

(Continued)

OTHER PUBLICATIONS

International Search Report in corresponding PCT Application No. PCT/US01/28956, dated Nov. 21, 2001.

(Continued)

*Primary Examiner* — Ryan F Pitaro
(74) *Attorney, Agent, or Firm* — Leydig, Voit & Mayer, Ltd

(57) ABSTRACT

A manufacturing/process control system information access provider architecture is disclosed. Manufacturing/process control system data provider flexibility is achieved through a user-configurable manufacturing/process control information portal server that comprises multiple selectable data provides (sources) and/or data types that a particular data provider accommodates. A user configures the portal server to deliver manufacturing/process control information associated with a controlled process environment, such as a food processing plant floor or an oil refinery reactor, to the user via a browser client over the Internet or a corporate intranet. Furthermore, an extensible architecture is provided that enables adding new components to the portal server. Such extensions include new data sources and new data types/handlers. The new architecture enables a user to select particular ones of the available data handlers and then their associated data sources thereby facilitating customizing the configuration of the portal server to the particular needs/interests of the user.

20 Claims, 12 Drawing Sheets

U.S. PATENT DOCUMENTS

2002/0046254 A1* 4/2002 Khan et al. .................... 709/217
2002/0052954 A1* 5/2002 Polizzi et al. ................. 709/225

OTHER PUBLICATIONS

International Search Report in corresponding PCT Application No. PCT/US01/29310, dated Dec. 26, 2001.

Hansen et al. "A Performance Tracking Methodology and Decision Support Mode," IEEE, 2000, pp. 256-262.

InfoPower Systems et al: "The Corporate Portal Solution," Internet Citation. [On-Line]; Oct. 15, 1999; URL:http://www.enteract.com/{ipsi/aportal.htm> [retrieved on Mar. 26, 2002].

John et al.:, "XNAMI—An extensible XML-based paradigm for network and application management instrumentation" IEEE International Conference on Networks. ICON. Proceedings of ICON; Sep. 28, 1999; pp. 115-124.

Supplemental European Search Report.

* cited by examiner

FIG. 3

| | |
|---|---|
| 154 | ID |
| 155 | Type |
| 156 | Alias |
| 157 | Server |
| 158 | Database |
| 159 | UserId |
| 160 | Password |
| 161 | Description |
| 162 | Contact |
| 163 | Default Server |

FIG. 4

Data Source Configuration

166

Alarm | InSQL | ADMIN | Create New

Type
InSQL

Alias

Description

Server-Name  ☐ Default

UserName

Password

Contact Name

Submit

FIG. 6

| | |
|---|---|
| 200 | AddItem |
| 202 | RemoveItem |
| 204 | Start |
| 206 | Stop |
| 208 | RemoveAllItems |

FIG. 7

| | |
|---|---|
| 210 | GetName |
| 212 | GetId |
| 214 | GetItemValueType |
| 216 | GetIntValue |
| 218 | GetRealValue |
| 220 | GetStringValue |
| 222 | IsValueReady |
| 224 | SetItemListener |
| 226 | PokeStringValue |
| 228 | PokeIntValue |
| 230 | PokeFloatValue |

FIG. 8

| | |
|---|---|
| 232 | ItemStatus |
| 234 | ItemData |

FIG. 9

| | |
|---|---|
| 240 | Open |
| 242 | Close |
| 244 | Send |
| 246 | GetSessionID |
| 248 | SetPollState |
| 250 | GetPollState |

FIG. 10

| | |
|---|---|
| 260 | SessionCreated |
| 262 | SessionCreateFail |
| 264 | SessionClosed |
| 266 | Receive |
| 268 | SendFail |
| 270 | SendSucceed |
| 272 | SessionError |

| | |
|---|---|
| 450 | ID |
| 452 | Name |
| 454 | Description |
| 456 | WSDL |
| 458 | Extended WSDL |
| 460 | Connection String |

FIG. 16  FIG. 17
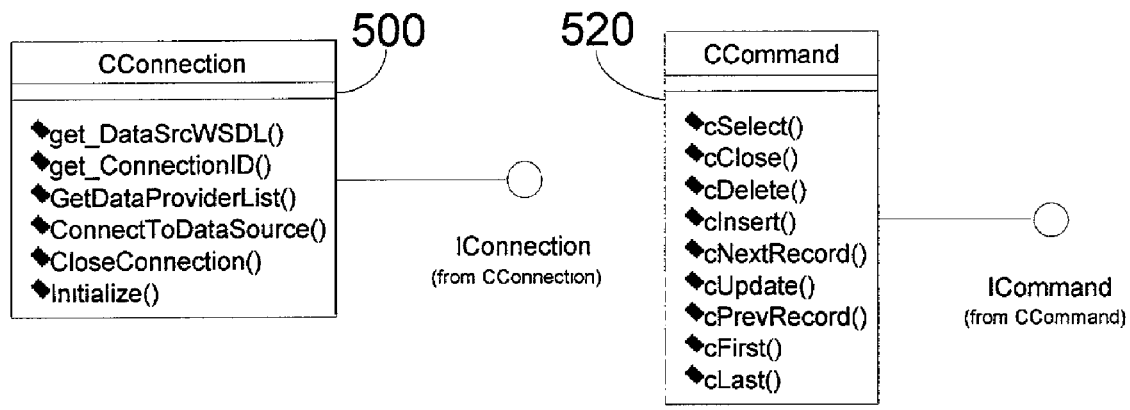
FIG. 18
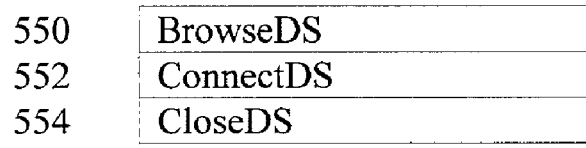

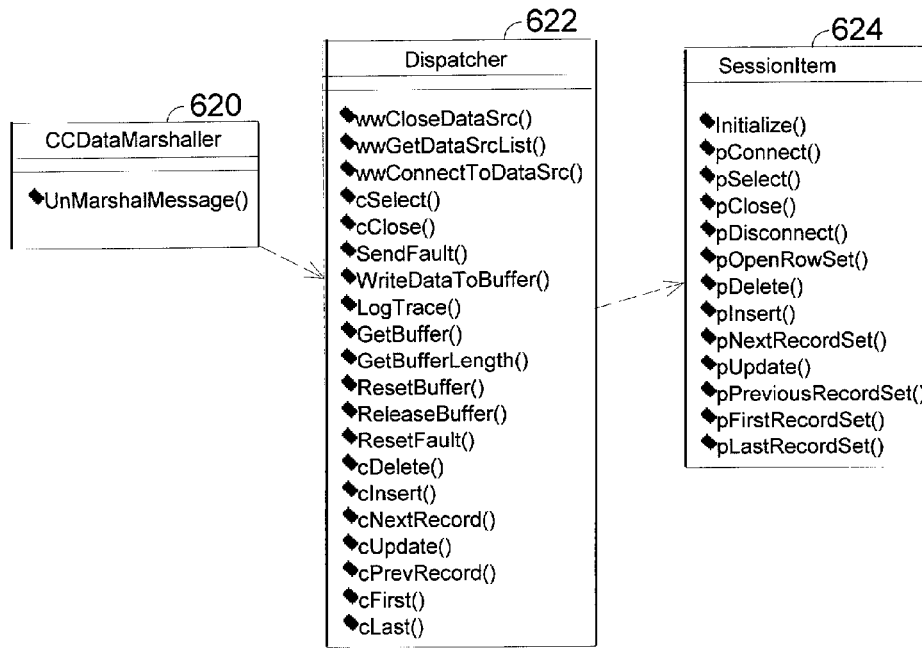

EXTENSIBLE MANUFACTURING/PROCESS CONTROL INFORMATION PORTAL SERVER

CROSS REFERENCE TO RELATED APPLICATION

This application claims priority of Forney et al. U.S. provisional application Ser. No. 60/232,733, filed on Sep. 15, 2000, entitled "Extensible Manufacturing Portal Server," the contents of which are expressly incorporated herein by reference in their entirety including the contents and teachings of any references contained therein.

FIELD OF THE INVENTION

The present invention generally relates to the field of computerized manufacturing/process control networks. More particularly, the present invention relates to systems for providing access by supervisory level applications and users to manufacturing/process control information. The present invention concerns the provision of such information from multiple, potentially differing sources having differing data types.

BACKGROUND OF THE INVENTION

Significant advances in industrial process control technology have vastly improved all aspects of factory and plant operation. Before the introduction of today's modern industrial process control systems, industrial processes were operated/controlled by humans and rudimentary mechanical controls. As a consequence, the complexity and degree of control over a process was limited by the speed with which one or more people could ascertain a present status of various process state variables, compare the current status to a desired operating level, calculate a corrective action (if needed), and implement a change to a control point to affect a change to a state variable.

Improvements to process control technology have enabled vastly larger and more complex industrial processes to be controlled via programmed control processors. Control processors execute control programs that read process status variables and execute control algorithms based upon the status variable data and desired set point information to render output values for the control points in industrial processes. Such control processors and programs support a substantially self-running industrial process (once set points are established).

Notwithstanding the ability of industrial processes to operate under the control of programmed process controllers at previously established set points without intervention, supervisory control and monitoring of control processors and their associated processes is desirable. Such oversight is provided by both humans and higher-level control programs at an application/human interface layer of a multilevel process control network. Such oversight is generally desired to verify proper execution of the controlled process under the lower-level process controllers and to configure the set points of the controlled process.

Various data input/output servers, including for example data access servers, facilitate placing process control data (both reading and writing) within reach of a variety of higher-level monitor/control client applications. During the course of operation, process controllers generate status and control information concerning associated processes. The controllers' process status and control information is stored within process control databases and/or distributed to a number of locations within the process control network. Other process information is generated/stored within field devices (e.g., intelligent transmitters) having digital data communication capabilities. The process information is retrieved from the process control databases and field devices by data access servers for further processing/use by the process control system. For example, the data access servers provide the retrieved information to a variety of client applications providing high-level control and monitoring (both human and computerized) services.

In systems containing data input/output servers, the high-level control and monitoring applications rely upon the proper operation of the servers to provide the data upon which such applications rely for decision making. The information includes real-time process variable values, alarms, etc. Data input/output servers are implemented in a number of forms. In some systems, a single data access server operates upon a single node on a computer network from which higher-level supervisory control is implemented. In other systems, multiple data access servers are located upon a local area network, and the multiple data access servers are accessed by supervisory-level applications running on other nodes on a local control network. In yet other systems, access to process control information/resources is achieved via temporary sessions established via a wide area network link. One particular example is data access provided via an Internet/intranet portal server.

A portal site is an Internet/intranet site that provides access to a variety of information from potentially many sources. Portal sites, referred to as vertical portals, are sometimes designed to provide access to a particular type of information. Portal servers handle user traffic at portal sites and provide user access over the Internet/intranet to the variety of data sources exposed by the portal site. Users generally access the portal site via remote computers executing general browser software such as the well known MICROSOFT INTERNET EXPLORER. Through the browsers the users access the data sources exposed by the portal site/server.

Portal servers provide a wide variety of services. One example of such a service is "content accessibility" that facilitates connectivity to information sources and content providers. Content includes: online documents, libraries, databases, and government information. Such content can be located over a wide geographic area, but is connected via a network structure (e.g., the Internet). Another example of a portal service is a search engine that enables users to locate particular information within a vast amount of available content. A portal server often maintains an index to enhance performance of searches. Another portal service is visualization of available services (e.g., displaying various features available to users). A second aspect of visualization is displaying documents and information retrieved at the request of a user. Yet another portal server function is providing access to users from many parts of the world via the World Wide Web. Such access includes both domestic and foreign users. A last example of a portal function is support for personalization. A portal is used by many different people for many purposes. Portal servers store user profile information to enhance user experiences.

An advantage of a portal server approach to accessing process control information/resources is the ability of users to gain access from virtually any location in the world. Such access enables specialists (both human and programmed) to obtain access to and provide supervisory services without having to be physically present on the manufacturing/industrial plant. Such accessibility can save an enterprise considerable time and costs and avoid travel delays. Wide area network access of the type supported by a portal server also enables centralized, coordinated and highly integrated control of an enterprise spread over a relatively wide geographic area. Notwithstanding the significant benefits of providing Web access to a process control network, significant challenges are faced with regard to connecting such systems to the manufacturing/process control systems with which they communicate, and there is a substantial cost in time and effort to link the various resources to manufacturing/process control information portal servers.

Yet another obstacle in the deployment and maintenance of manufacturing/process control information portal servers is the presence of a wide variety of information types. Installing a new portal server when a new data transmission protocol or format is needed can greatly disrupt operation of the manufacturing/process control system for which it provides its services.

Typical portal sites/servers are designed to provide virtually the same resources to a very large audience. In a process control environment, information sources and types are tailored to many different and significantly smaller groups of individuals. The various information types require different handlers. Even within an enterprise, persons having differing roles will have an interest in viewing data of differing types from differing sources.

SUMMARY OF THE INVENTION

The present invention offers a flexible manufacturing/process control information provider architecture. This flexibility is achieved through a user-configurable manufacturing/process control information portal server that comprises multiple selectable data types (handlers) and data sources that a particular selected data handler accommodates. A user configures the portal server to deliver manufacturing/process control information associated with a controlled process environment such as a food processing plant floor or an oil refinery reactor to the user via a browser client over the Internet or a corporate intranet.

Furthermore, an extensible architecture is provided that enables adding new components to the portal server. Such extensions include new data sources, new data types, and new generic data handlers. The new architecture enables a user to select particular ones of the available data handlers and then their associated data sources thereby facilitating customizing the configuration of the portal server to the particular needs of the user.

BRIEF DESCRIPTION OF THE DRAWINGS

The appended claims set forth the features of the present invention with particularity. The invention, together with its objects and advantages, may be best understood from the following detailed description taken in conjunction with the accompanying drawings of which:

FIG. 3 is a block diagram listing fields that are included in provider table records within a configuration database;

FIG. 4 is a screen shot of an exemplary graphical user interface (GUI) used for defining a new data source (provider) to be stored as a new table entry in a configuration database;

FIG. 6 is a block diagram listing the methods of an exemplary IRunTimeDB interface exposed by an RDB for use by a data exchange (DE);

FIG. 7 is a block diagram listing methods of an exemplary IOItem interface exposed by an RDB for use by a DE;

FIG. 8 is a block diagram listing methods of an exemplary IOItemListener interface exposed by a DE for use by an RDB;

FIG. 9 is a block diagram listing methods of an exemplary IOutpost interface exposed by an HTTP Client Interface (HCI) for use by an RDB;

FIG. 10 is a block diagram listing methods of an exemplary IOutpostSessionListener interface exposed by an RDB for use by an HCI;

FIG. 16 is a block diagram listing methods of an exemplary connection object;

FIG. 17 is a block diagram listing method of an exemplary command object;

FIG. 18 is a block diagram listing methods supported by a framework Web service handler;

FIG. 20 is a block diagram depicting exemplary relationships among three object classes within a framework Web service handler;

FIG. 21 is a block diagram listing exemplary methods implemented within a data provider handler.

DETAILED DESCRIPTION OF AN ILLUSTRATIVE EMBODIMENT

Figure 1:
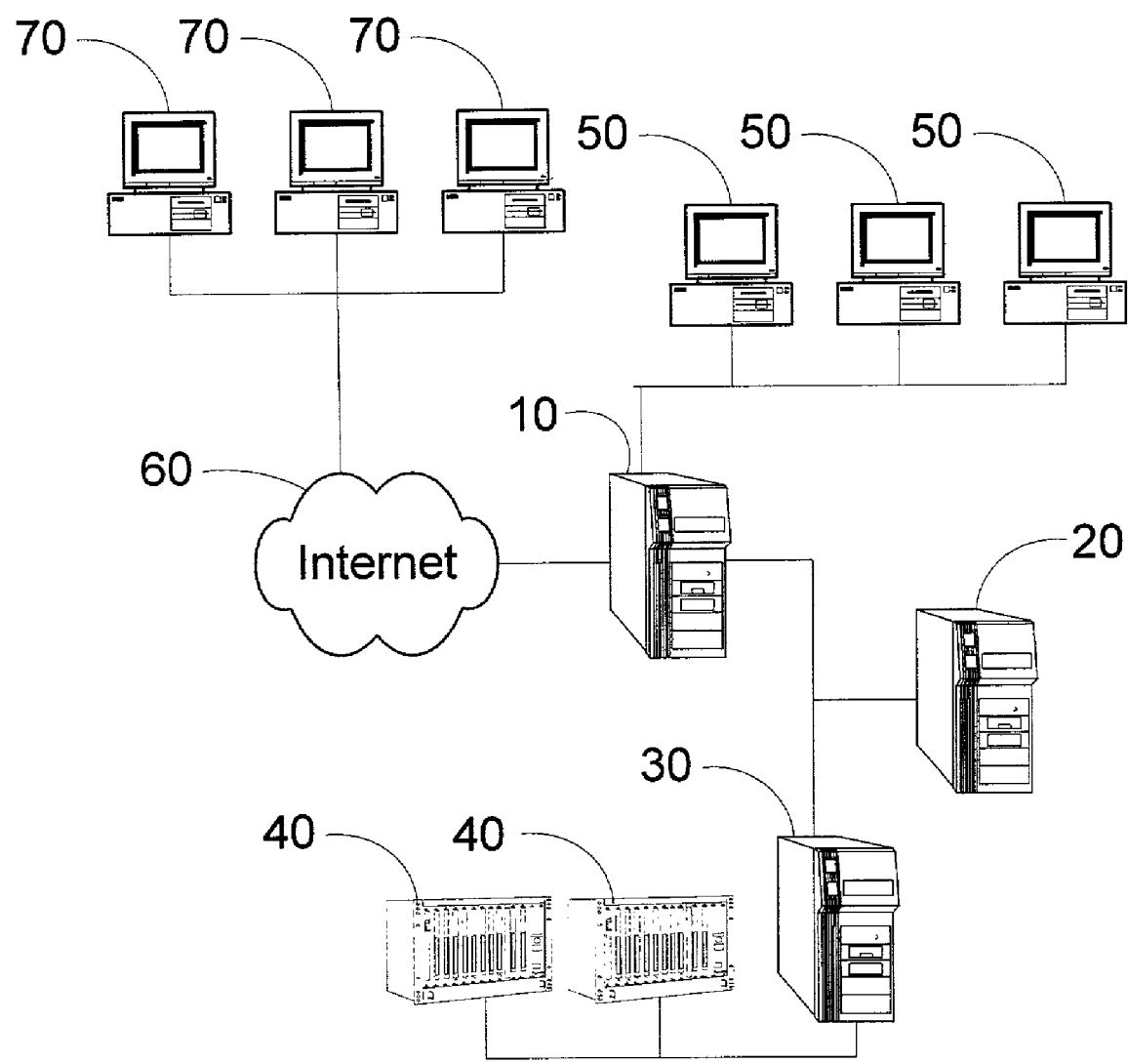
FIG. 1 is a schematic drawing depicting an exemplary process control environment for the present invention wherein a manufacturing/process control network includes a portal server that provides a variety of portal services to browser clients.

The present invention concerns an extensible manufacturing/process control information portal server that enables users to visualize plant floor information coming from a variety of systems and databases (e.g., Wonderware's InTouch systems, InTouch/AlarmSuite alarm databases, I/O servers, and Industrial SQL) over the Internet or an intranet via a browser (e.g., IE 5). The extensible manufacturing/process control portal server supports interactive HTML pages in XML, applying an XSL transformation, and dynamically rendering VML on a client machine (as well as providing animation updates from live process data sources). The portal server allows users to generate ad hoc queries of a real-time process control SQL database to produce trends and reports viewable with a browser client such as MICROSOFT'S INTERNET EXPLORER. In addition, the portal server supports Internet enabled ActiveX controls and a SQL server report tool. The manufacturing/process control portal server supports bi-directional communications between browser-clients and a data provider associated with an observed manufacturing/process control system.

An exemplary manufacturing/process control information portal server described herein below provides a user configurable data handler and data source designation interface. First, a user designates a type of information (associated with a particular data handler). Second, the user designates a source of information of the selected information type. For example, a user can select an "alarm" data type/handler. Thereafter, the user selects a portion of the plant (i.e., an information source) for which data is supplied. Thereafter, the portal server is configured, through the instantiation of appropriate objects, to deliver the configured data to the requesting browser client. The user can be either human or a machine submitting appropriate commands to the portal server configuration facilities.

An exemplary manufacturing/process control information portal server incorporating the present invention provides an extensible portal server architecture enabling developer/users to extend the capabilities of the system. A first form of such extension comprises the ability of a user to re-configure the portal server to provide information from a designated resource. A second form of extending the portal server's capabilities is adding new data handlers to support new forms/formats of data that are used to provide information from connected sources.

The extensible manufacturing/process control portal server of the present invention provides a highly flexible infrastructure for aggregating plant floor information (for client applications) and disseminating data back to, for example, a manufacturing plant floor. The access is provided to client-users via the Internet and intranets. The extensible architecture and technology allow users to add new data sources to the main portal server. The extensible architecture also facilitates adding new data handlers.

In general, the extensible architecture is facilitated by a set of generic interface definitions that facilitate the creation of source-specific and handler-specific object components. Each of the added components (handlers and sources) is carried out by an object class (or subclass) defined according to the set of generic interface definitions. In an embodiment of the invention, server developers are aided by a toolkit which simplifies the process for developing new handlers and sources that are added to the extensible portal servers. The toolkits also ensure that the added components comply with requirements of the generic interface definitions.

Turning to FIG. 1, an exemplary portal server arrangement is schematically depicted. A portal server 10 provides portal services to a manufacturing/process control environment. That environment consists of a database server 20 and a data access server 30. The data access server 30 in turn connects to process control equipment 40. The portal server 10 provides its services to browser clients at locally connected workstations 50 and, via the Internet 60 or a proprietary network, at remote workstations 70. The connected workstations 50 and remote workstations 70 connect to the resources of the portal server 10 via browser clients such as, for example, MICROSOFT's INTERNET EXPLORER. The above network is merely a simple example of an application of the present invention. Those skilled in the art will readily appreciate the broad spectrum of network topologies and environments in which a manufacturing/process control information portal server embodying the present invention can operate.

Figure 2:
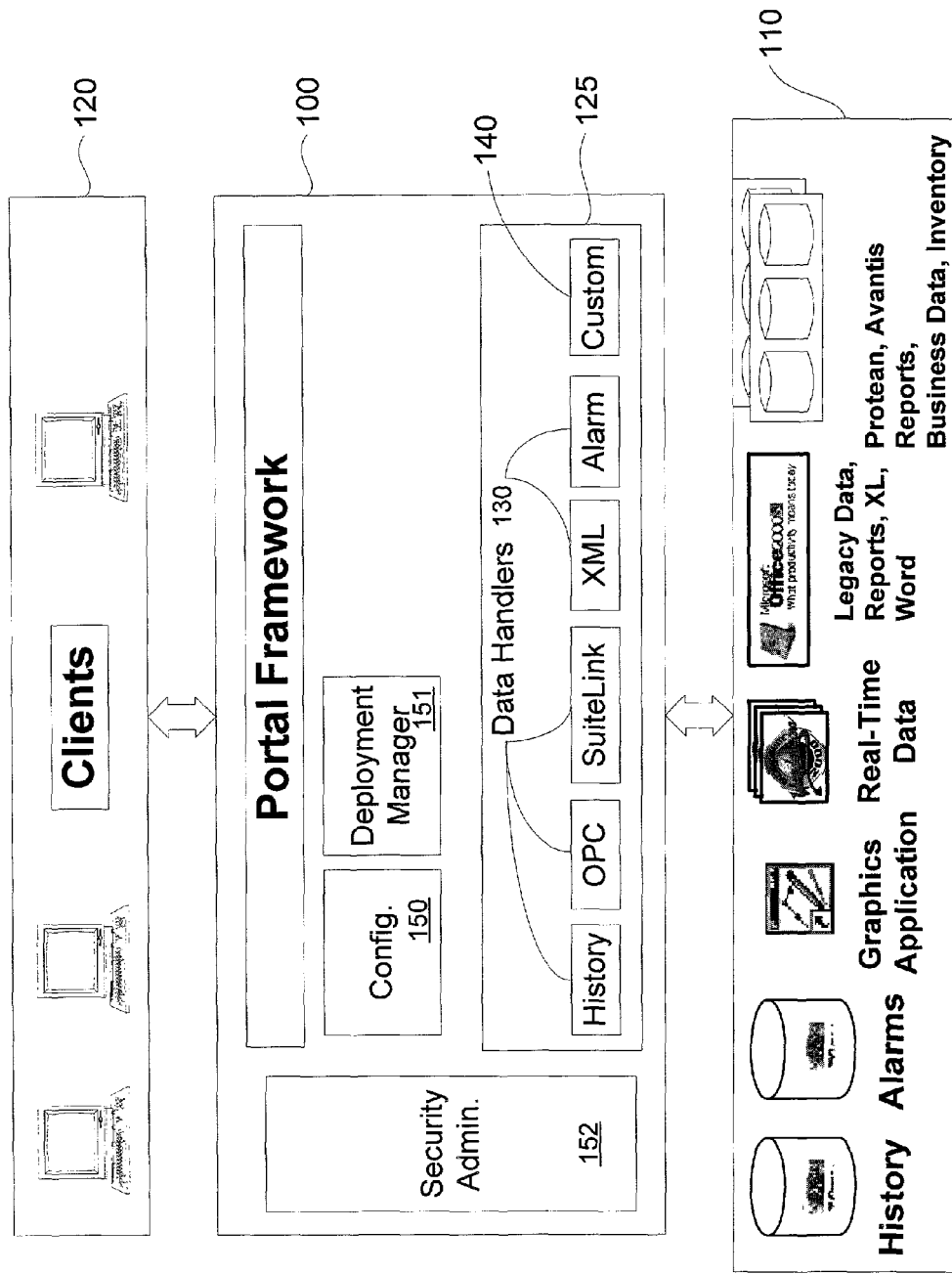
FIG. 2 is a schematic drawing of the general components making up an exemplary manufacturing/process control portal server system.

Turning to FIG. 2, components of a first exemplary extensible portal server architecture are illustratively depicted. The portal server 100 is interposed between sources of manufacturing and process control information of various information types 110 and a set of browser clients 120. Such clients 120 can be thin clients running little or no application-specific software. The clients 120, executing browsers and generic browser support software, rely upon the processing capabilities of the portal server to provide the manufacturing and process control information in a browser-ready format. The browser clients 120 generate the corresponding display information and transmit user selections back to the portal server 100. The portal server 100 also provides a configuration interface depicted herein below with reference to FIG. 4 that enables a user to add a new data source to a set of data sources from which the portal server 100 obtains data on behalf of the browser clients 120. Such configuration information is stored within a configuration database 150 in an manner such as the exemplary record depicted herein below with reference to FIG. 3.

The information sources (typically servers—but not depicted in the Figure) of various types 110 supply information to the portal server 100 in a variety of formats. As indicated in FIG. 2, such types include history (archived process control information), alarms, graphics applications (e.g., trend graphs), real-time manufacturing/process control system data supporting remote monitoring of a system, and business information (generally stored within databases). The portal server includes a data access subsystem 125 that is responsible for retrieving and sending data (in real-time) between the portal server 100's browser client interface framework and an enterprise's sources of information (e.g., plant floor process control status and control information). The data access sub-system 125 (see FIG. 3) comprises an extensible set of data handlers 130 that process the information rendered by the information sources 110 in specialized formats. The data handlers include, for example, history and alarm handlers. Other data handlers are associated with particular client data exchange protocol formats such as OPC, SuiteLink, and DDE. Another identified handler processes XML. A custom block 140 is intended to depict the extensibility of the set of data handlers 130 which supports the addition of new (custom) configurations of data handlers after initial installation. This is facilitated by an open architecture and a generic interface definition between the data handlers and a portal framework-client interface that renders web pages to the requesting clients based upon corresponding information provided by particular data sources via corresponding ones of the data handlers 130.

The portal server 100 includes a number of sub-systems. Configuration of the portal server, including user-configuration described herein, is supported by a configuration database 150. The configuration database includes a data_providers table that stores connection information linking data providers (external data sources) to the portal server 100 that in turn connects to a requesting client. The data_providers table is accessed by a "Data Source Configuration" web page presented to users of the portal server 100 (see FIGS. 3 and 4). In an enhanced embodiment of the invention a second configuration interface enables users to add new data handlers (for handling new data types) to the portal server system. When a new data handler is added to the portal server 100, a set of registration information (see FIG. 13 discussed herein below) is stored within a data handlers registry that is separate and distinct from the data_providers table maintained within the configuration database 150.

In some cases client browsers need plug-in components to view portal information. For example, if process graphics contain ActiveX components, then the ActiveX components need to be downloaded. This task is accomplished by a deployment manager 151. The deployment manager 151 combines all files that must be downloaded, registers the components on client machines, and initializes them.

A security administration sub-system 152 facilitates limiting access to particular resources. The security system 152 enforces access rights with regard to particular resources accessed by identified users. Other potential sub-systems include multi-language support and multi-user concurrent user license management.

Having described an exemplary manufacturing/process control portal server system, attention is now directed to the extensible/configurable aspects of the portal server system. As mentioned previously herein above, the portal server is extensible in that a user can configure a new data provider (source of data) to add to an available set of sources listed in the configuration database 150. Turning now to FIG. 3, a set of fields is identified that is included in provider table records within the configuration database 150. An ID field 154 stores a unique value identifying the record within the table of provider records. The value stored in the ID field 154 is system-generated at the time the record is created. A type field 155 describes the type of data handler (e.g., Alarm, History, Statistics, Real-Time Data) with which this data source is associated. Thus, when a user selects a particular information type (e.g., alarms), all data providers that provide this data type are retrieved and listed for the user's selection.

An alias field 156 stores an alias name for this data handler. For Internet connection and security, it is advisable to hide original names through the use of alias names. A server field 157 holds a name of a server that is acting as the data provider. A DB field 158 holds the database name for the data provider. A User field 159 and password field 160 hold the system username and password for the data provider (if needed to access the server). The appropriate data handler uses the name and password to login on to a database server. Passwords are encrypted before they are stored. A description field 161 holds the information regarding a data handler description. A contact field 162 holds information regarding a system administrator description for this provider. Finally, a default server field 163 stores a default server identity. If a user has configured many data providers, the user picks a particular server as a default server for user queries.

Having described exemplary fields for a data provider record, attention is directed to FIG. 4 wherein an exemplary graphical user interface (GUI) is provided for a user to define a new data source (provider) to be stored as a new table entry in the configuration database 150. The graphical user interface includes a set of tabs 166 labeled Alarm, InSQL, Admin, and Create New. The Alarm and InSQL tabs correspond to particular data handlers that are presently installed on the extensible portal server. When a user selects either of the two data handler tabs, a user interface is generated that includes all data sources that provide the selected data type. The Admin tab provides access to a variety of administration data including user activity on the portal server.

Finally, the Create New tab corresponds to the data source extensibility feature of a portal server embodying the present invention. When a user selects the Create New tab, the user interface provides the template depicted in FIG. 4, and the user enters data corresponding to the various fields of the data provider record depicted in FIG. 3 and explained herein above. After completing the data source/provider "form", the user selects the "submit" button to cause the incorporation of the defined data source into the extensible list of data providers. In an enhanced embodiment of the present invention, the extensibility of the portal server 100 includes adding new data handlers (discussed further herein below).

Figure 5:
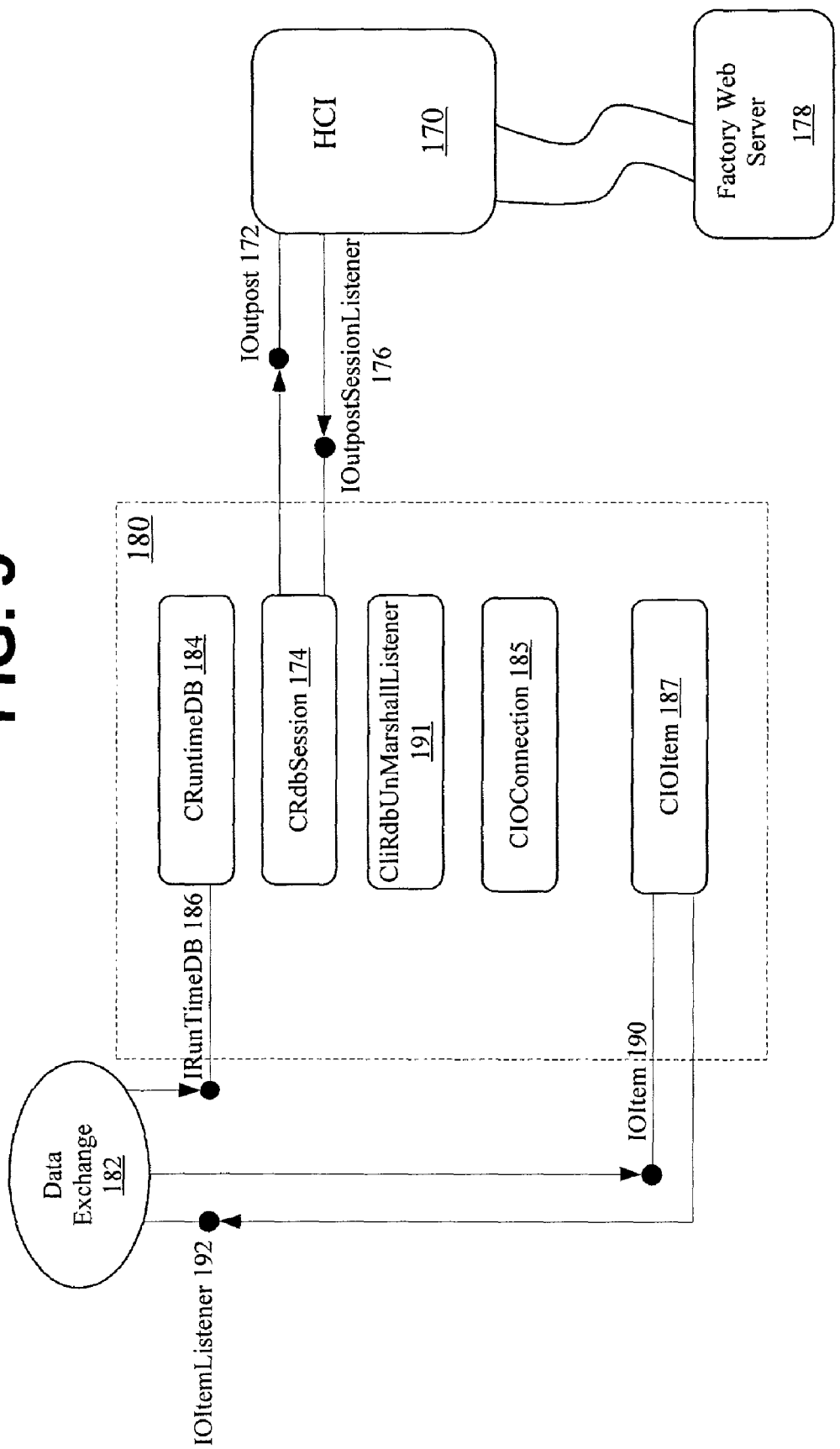
FIG. 5 is a schematic drawing of the details of an exemplary runtime database (RDB)

Turning to FIG. 5, the data access subsystem 125 is depicted in further detail. FIG. 5 depicts the flow of information, via a set of logically connected objects, from a data exchange 182 to an RDB internal class object and then to an HCI component 170 connected to a plant floor server 178 for a client session. The data access subsystem 125 includes two COM components. A first COM component, HCI (HTTP Client Interface) 170, sets up an HTTP connection for sending and receiving raw data between the portal server and a plant floor web server 178. The HCI 170 implements an Ioutpost interface 172 for receiving requests from a CrdbSession object 174. The CrdbSession object 174 implements an IoutpostSessionListener interface 176.

The HCI 170 is a lowest-layer component on the data access subsystem 125 that is responsible for establishing connection to the server 178. The HCI 170 uses the http Internet API to open a connection with the server 178, then utilizes a post request to communicate with the fsoutpst.dll, an ASAPI extension component, on the server 178. The fsoutpst.dll then routes the request to rdbhandler, a service component on the server 178. The HCI 170 internally creates a thread to send a heartbeat to the server 178 every 200 ms to keep the connection alive and to check for any data available for sending from the server 178.

A second COM component of the data access subsystem 125, a runtime database (RDB) 180, marshals and unmarshals data (allowing it to be passed to an intended destination) and interacts with a data exchange 182. The data exchange 182 performs the task of passing data between connected client browser sessions and the RDB 180 via a designated item tag established in the runtime database component.

When a user completes designating a source of data, the data exchange (DE) component 182 first creates an instance of CruntimeDB 184 through the IRuntimeDB interface 186. Then the DE component 182 calls an AddItem method on CruntimeDB 184 to tell the RDB 180 to add a tag to the data access subsystem for a new item. The AddItem method returns an IOItem interface 190 that allows the DE component 182 to write data back to the web server 178 via the RDB 180. In order for the DE 182 to receive data on the tag, it must call the setItemListener method through the IOItem interface 190 to hand the RDB 180 an IOItemListener interface 192 of the DE 182.

When the DE 182 adds a tag to the data access subsystem 125, the RDB 180 creates and queues the messages internally and does not send them to the web server 178 until a Run method is called through the IRuntimeDB interface 186 to start a data-writing thread. Each instance of the CrdbSession 174 has an interface pointer and a connection point that allows it to send and receive to/from the HCI 170.

Connections between the DE 182 and a selected data source are associated with sessions. Thus, when the data exchange 182 calls the AddItem method on CruntimeDB 184 to add a tag item, the RDB 180 internally creates the CRdbSession class object base 174 on the Web server address, user ID, and password. The CrdbSession object 174 then creates a CIOConnection class object base 185 on NodeName, App Name, Topic, and Connection Type. Then the CIOConnection object 185 creates a CIOItem object base 187 on a tag name. With this design, the CrdbSession object 174 maps to a client session on the server, the CIOConnection object 185 maps to a node and application, and the CIOItem object 187 maps to a tag on the application. Each session on the server can have multiple connections to different nodes or applications, and each application can have many tag items.

Having described the general connection architecture, the following describes data flow from a plant floor data source web server 178 to the data exchange 182. The HCI component 170 includes an internal thread that periodically sends out a heartbeat to the server to keep the connection alive and to determine whether any data is available. When the HCI 170 receives data from the server 178 it passes the data to the RDB 180 component through the IoutpostSessionListener 176 interface (connection point) of the CrdbSession object 174. The RDB 180 passes this data to its internal class object CliRdbUnMarshallListener 191 to unmarshal the data. Once the data is unmarshalled, it is passed to the (proper) CIOConnection object 185 and then to the CIOItem object 187. The CIOItem object 187 then calls the DE 182 via the IOItemListener interface 192 to provide the new tag value to the DE 182.

With regard to data flow from the DE 182 to the plant floor, the DE 182 calls a method in the IOItem interface 190 to write the data back to the server 178. The data travels through an internal class to be marshaled and then to CrdbSession 174. The CrdbSession sends the data value to the HCI 170 via the Ioutpost interface 172.

Having described the general architecture of the connection framework within the data access component 125 of a portal server embodying the present invention, attention is directed to FIGS. 6, 7, 8, 9, and 10 that identify each of the methods incorporated into the above-mentioned interfaces associated with the data access component 125.

The IruntimeDB interface 186 comprises the following methods described herein below with reference to FIG. 6. A call to AddItem 200 will add another data item to the session causing the RDB 180 to track this item from a particular data source associated with the session.
HRESULT AddItem([in] BSTR bstrOutpost, [in] BSTR bstrNode, [in] BSTR bstrApp, [in] BSTR bstrTopic, [in] BSTR bstrConnType, [in] BSTR bstrItem, [out, retval] IDispatch **ppIOItem)
Parameters
BstrOutpost—destination server address
bstrUserName—user name for authentication
bstrPassword—password for authentication
bstrNode—node name
bstr App—Application name
bstrTopic—Topic name
bstrConnType—Connection type
bstrItem—Item name
ppIOItem—Pointer to IOItem interface
The RemoveItem 202 method is called to remove an item from a session.
HRESULT RemoveItem([in] BSTR bstrOutpost, [in] BSTR bstrNode, [in] BSTR bstrApp, [in] BSTR bstrTopic, [in] BSTR bstrConnType, [in] BSTR bstrItem)
Parameters
BstrOutpost—destination server address
bstrUserName—user name for authentication
bstrPassword—password for authentication
bstrNode—node name
bstr App—Application name
bstrTopic—Topic name
bstrConnType—Connection type
bstrItem—Item name
The Start 204 method is called to start processing data.
HRESULT Start( )
The Stop 206 method is called to stop processing data.
HRESULT Stop( )
The RemoveAllItems 208 method is called to remove all items associated with the session.
HRESULT RemoveAllItems( )

Turning now to FIG. 7 a set of methods associated with the IOItem interface 190 are summarized by reference to their parameters. First, a getName 210 method retrieves the item name.
HRESULT getName([out] BSTR *bstrName)
Return Value:
BstrName—Item name
A getID 212 method is called to get an item ID.
HRESULT getId([out] int *pId)
Return Value:
pId—Item ID
The remaining methods are largely self-explained by their method names and associated parameter definitions.
GetItemValueType 214:
HRESULT getitemValueType([out] int *piValue)
Return Value:
PiValue—item value type
GetIntValue 216:
HRESULT getIntValue([out] int*pValue)
Return Value:
pValue—Item integer value
GetRealValue 218:
HRESULT getRealValue([out] float *pfValue)
Return Value:
pfvalue—Item float value
GetStringValue 220:
HRESULT getStringValue([out] BSTR *pbstrValue)
Return Value:
pbstrValue—Item string value
IsValueReady 222:
HRESULT isValueReady([out]BOOL *pbValue)
Return Value:
pbValue—TRUE (data ready), FALSE(data not ready)
SetItemListener 224:
HRESULT setItemListener([in] IDispatch *newItemListener)
Return Value:
newItemListener—Pointer to the listener interface
PokeStringValue 226:
HRESULT PokeStringValue([in] BSTR *newValue)
Return Value:
NewValue—string value to poke
PokeIntValue 228:
HRESULT PokeIntValue([in] int newValue)
Return Value:
newValue—Integer value to poke
PokeFloatValue 230:
HRESULT PokeFloatValue([in] float newValue)
Return Value:
newValue—float value to poke
With reference to FIG. 8, the IOItemListener Interface 192 includes an ItemStatus 232 method call that returns a status of an indicated item.
HRESULT itemStatus([in] int ItemId, [in] int ItemStatus);
Parameters:
ItemId—Specify a specific item id#
ItemStatus—giving status of item
An itemData 234 method is a call for an identified data item.
HRESULT itemData([in] int ItemId,[in] VARIANT *pvarData);
ItemId—Specify a specific item id
pvarData—different type of data
With reference to FIG. 9, the HCI component interface Ioutpost 172 for the RDB 180 includes the following methods.

Open 240:
  HRESULT Open([in] int Scheme,[in] BSTR bstrUsername,[in] BSTR bstrPassword,[in] BSTR bstrOutpost, [in] BSTR bstrPort,[in] BSTR bstrHandler, [in] int iPollstate,[out] SCODE *pError)
Close 242:
  HRESULT Close([out] SCODE *pError)
  Return Value:
  pError—(S_OK—successful)
Send 244:
  HRESULT Send([in] VARIANT *pvarBuff, [in] int iSize, [in] int iRequestID, [in]int iSenderID,[out] SCODE *pError)
  Parameters:
  pvarBuff—pointer to data
  iSize—length of data
  iRequestID—a unique request ID
  iSenderID—a unique sender ID
  Return Value:
  pError—(S_OK—successful)
GetSessionID 246:
  HRESULT GetSessionID([out] int *piID,[out] SCODE *pError)
  Return Value:
  piID—return the session ID
  pError—(S_OK—successful)
SetPollState 248:
  HRESULT SetPollState([in] int iState,[out] SCODE *pError)
  Parameters:
  iState
  Return Value:
  pError—(S_OK—successful)
GetPollState 250:
  HRESULT GetPollState([out] int *piState,[out] SCODE *pError)
  Return Value:
  piState
  pError—(S_OK—successful)

Turning to FIG. 10, the following methods are implemented in the IoutpostSessionListener Interface 176 of the CrdbSession object 174.
SessionCreated 260:
  HRESULT sessionCreated([in] int sessionID)
  Parameters:
  sessionID—created session ID
SessionCreateFail 262:
  HRESULT sessionCreateFail([in] int errorCode)
  Parameters:
  ErrorCode—
SessionClosed 264:
  HRESULT sessionClosed ([in] int sessionID)
  Parameters:
  sessionID—ID of the closed session
Receive 266:
  HRESULT receive ([in] int sessionID,[in] VARIANT *buffer,[in] int bufferSize,[in] int requestID,[in] int senderID)
  Parameters:
  sessionID—session ID
  buffer—pointer to data
  buffersize—length of data
  requestID—request ID
  senderID—sender ID
SendFail 268:
  HRESULT sendFail ([in] int sessionID,[in] int reason,[in] int requestID,[in] int senderID)
  Parameters:
  sessionID—ID of failed session
  reason—reason for failing
  requestID—request ID
  senderID—sender ID
SendSucceed 270:
  HRESULT sendSucceed ([in] int sessionID,[in] int requestID,[in] int senderID)
  Parameters:
  sessionID—ID of succeed session
  requestID—request ID
  senderID—sender ID
SessionError 272:
  HRESULT sessionError ([in] int errorCode,[in] BSTR errorMessage)

Figure 11:
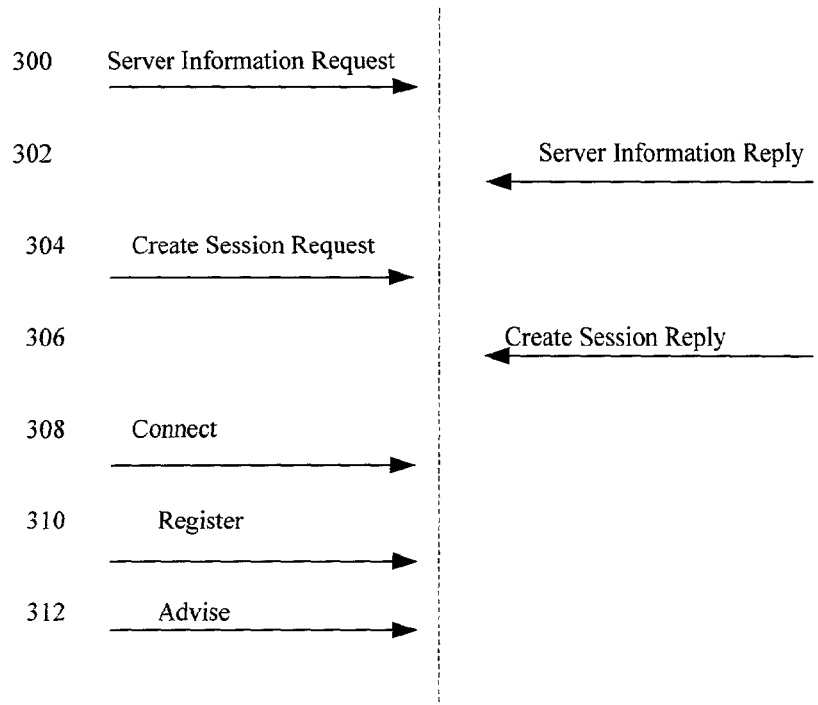
FIG. 11 is a dataflow diagram that depicts a sequence of calls and actions between a client (portal server HCI) and a plant server over an established HTTP connection.

Having described the creation of connections and interfaces between the DE 182 and a corresponding data source, attention is now directed to FIG. 11 that depicts a sequence of calls and actions between a client (portal server HCI 170) and a plant server 178 over an established http connection. Such a connection is created for data transmitted between the HCI 170 and web server 178 and is maintained for each windowset that displays on the client browsers. During stage 300, the HCI 170 transmits a server information request that gets the size of each packet the server can handle and the version of the protocol. The server information request follows the general format depicted below.
ServerInfoRequest:
  TYPE_HEADER+SERVER_REQUEST
  TYPE_HEADER
  {
    DWORD Length;
    DWORD Type; (SERVER_REQ=1)
    DWORD RequestID; (0)
    DWORD SendderID; (0)
    DWORD ErrorCode;
    DWORD Reserved[4];
  }
  SERVER_REQUEST
  {
    char clientInfo[128]; ("OutpostConnObject")
  }

In response, at step 302 the server 178 issues a server information response. The server 178's response follows the following format.
Server Info Reply:
  TYPE_HEADER+SERVER_RPLY
  TYPE_HEADER
  {
    DWORD Length;
    DWORD Type; (SERVER_REPLY=1)
    DWORD RequestID; (0)
    DWORD SendderID; (0)
    DWORD ErrorCode;
    DWORD Reserved[4];
  }
  SERVER_RPLY
  {
    DWORD MaxRequestSize;
    DWORD MaxReplySize;
    DWORD ProtocolVersion;
  }

Thereafter, at step 304 the client HCI 170 issues a create session request to the server 178 that follows the following format.
CreateSessionRequest:
  TYPE_HEADER+CREATE_SESSION_REQUEST

```
TYPE_HEADER
{
  DWORD Length;
  DWORD Type; (CREATE_SESSION=2)
  DWORD RequestID; (0)
  DWORD SendderID; (0)
  DWORD ErrorCode;
  DWORD Reserved[4];
}
  CREATE_SESSION_REQUEST
{
  char DstHandlerName[128]; ("WWRdbHandler")
  DWORD ProtocolVersion; (1)
}
```

In response, at step 306 the server 178 issues the following reply.

```
CreateSessionReply:
  TYPE_HEADER+CREATE_SESSION_REPLY
  TYPE_HEADER
  {
    DWORD Length;
    DWORD Type; (CREATE_SESSION_RPLY=3)
    DWORD RequestID; (0)
    DWORD SendderID; (0)
    DWORD ErrorCode;
    DWORD Reserved[4];
  }
  CREATE_SESSION_REPLY
  {
  DWORD HandlerId;
  DWORD SessionId;
  }
```

At step 308 the client HCI 170 issues a connect request to the server 178 generally as follows.

```
  WW_HEADER_INFO+WW_CONNECT_INFO
  WW_HEADER_INFO
  {
    DWORD type; (WW_CONNECT_INFO_TYPE=1)
    DWORD len;
  }
  WW_CONNECT_INFO
  {
    DWORD ConnType;
    DWORD ConnId;
    Char Node[128]; // client actually sends 128 bytes to
      server regardless of the actual data size
    Char App[128];
    Char Topic[128];
  }
```

Next, during step 310 the client HCI 170 registers with the server 178. Registration establishes particular data items for which the client HCI 170 wishes to receive updated values.

```
  WW_HEADER_INFO+WW_REGISTER_INFO
  WW_HEADER_INFO
  {
    DWORD type; (WW_REGISTER_INFO_TYPE=3)
    DWORD len;
  }
  WW_REGISTER_INFO
  {
    DWORD ConnId;
    char Item[64];
    DWORD ItemId;
  };
```

Thereafter, at step 312 the client HCI 170 issues periodic requests to the server 178 for updates with regard to particular registered items. An example of such a request follows.

```
  WW_HEADER_INFO+WW_ADVISE_INFO
  WW_HEADER_INFO
  {
    DWORD type; (WW_ADVISE_INFO_TYPE=5)
    DWORD len;
  }
  WW_ADVISE_INFO
  {
    DWORD ConnId;
    DWORD ItemId;
  }
  WW_HEADER_INFO+WW_REQUEST_INFO
  WW_HEADER_INFO
  {
    DWORD type; (WW_REQUEST_INFO_TYPE=7)
    DWORD len;
  }
  WW_REQUEST_INFO
  {
    DWORD ConnId;
    DWORD ItemId;
  };
  WW_HEADER_INFO+WW_POKE_INFO
  WW_HEADER_INFO
  {
    DWORD type; (WW_POKE_INFO_TYPE=8)
    DWORD len;
  }
  WW_POKE_INFO
  {
    DWORD ConnId;
    DWORD ItemId;
    WORD PokeId;
    WORD PointType;
    PTVALUE PointValue;
  }
```

It is noted that the above call sequences are merely exemplary. As those skilled in the art will readily appreciate, there are many ways in which to carry out the setup and update request sequence. Furthermore, the present example represents a pull strategy. However, in an alternative embodiment, the server 178 pushes changed data to a client HCI 170.

In a base system embodying the present invention, users select from an extensible set of data sources, but are confined to choose from a current set of data types. However, in an enhanced version of the present invention, a standardized data input interface incorporated into a toolkit (providing a development template) enables third party data providers to develop customized data handlers for new/proprietary data types. These customized data handlers render standardized data to the data exchange component 182. In this extensible embodiment of the present invention wherein the concept of an open architecture is broadened to include adding new data handlers, the data handlers are stored on the portal server system and are registered within a list of available handlers selectable by users. Thus, the portal server 100's functionality is extendable in this case to handle new data formats that were not incorporated within an initial release of the portal server 100 system.

Figure 12:
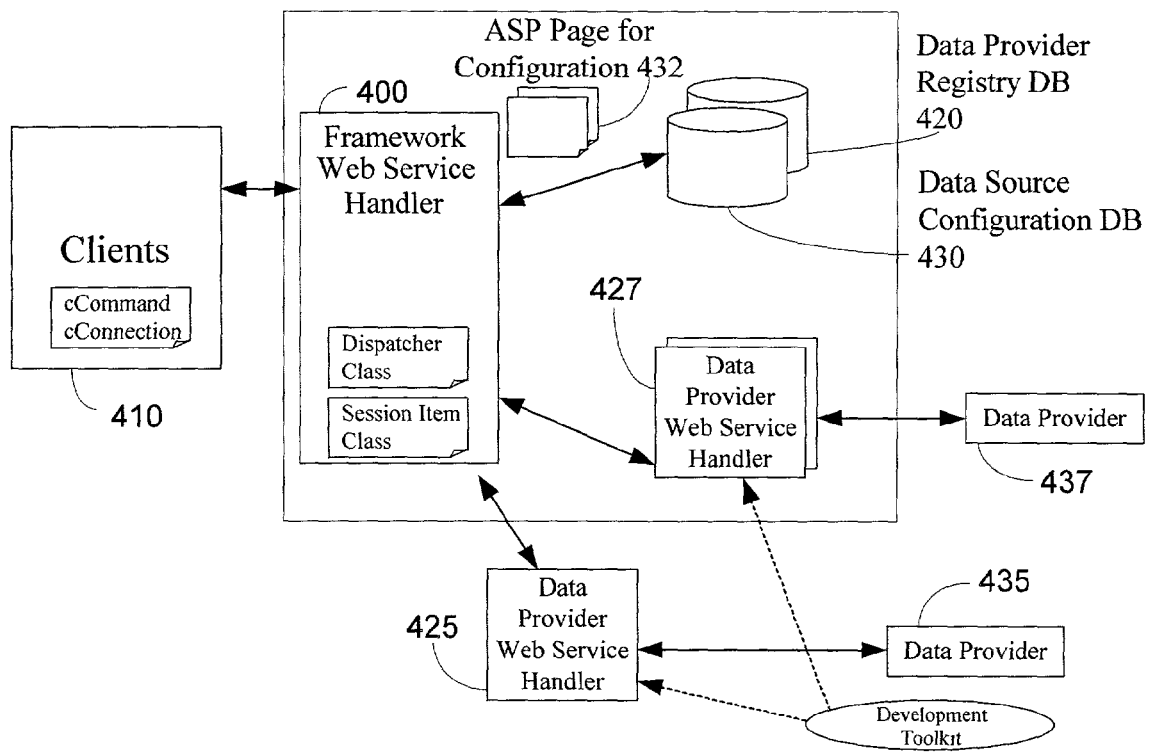
FIG. 12 is a schematic drawing of an exemplary embodiment of a portal server framework.

Turning now to FIG. 12, in a particular exemplary embodiment of the invention, a new portal server framework is provided in the form of a framework web service handler 400 that exposes a set of methods allowing client applications 410 to get a list of available data sources and/or data types from a data provider registry 420 that stores a set of entries corresponding to both external/third-party data provider Web service handlers 425 (created from a development toolkit) and internally developed data provider Web service handlers 427. Each of the data provider web service handlers (425 and 427) in turn connects to data sources that are associated with that data type. When a new handler or source is added by means of a configuration interface similar to the one depicted in FIG. 4, a new entry is added to the data provider registry 420 corresponding to the new provider.

It is noted that multiple web service handlers can exist that implement a same data type. Thus, the selection of a particular web service handler is driven by the data source configured by the user in a manner such as the one previously disclosed in FIG. 4 and discussed herein above. However, in view of the potentially large number of data handlers supported by the present architecture, a new interface arrangement, such as a drop-down list of handlers, may be desired to avoid the presence of too many tabs (as shown in FIG. 4). A data source configuration database 430 supplies a set of ASP pages 432 facilitating selection of a particular data source/handler. Thereafter the clients 410 connect to a particular data provider, via the framework web service handler and retrieve a set of methods that are supported by the selected provider. Third parties implement their own data provider handlers as web services and register with the framework web service handler 400 to enable the clients 410 to access the third-party data provider. The framework web service handler 400 enforces a common set of interfaces that each data provider web service handler (e.g., 425 and 427) implements to plug data providers of a particular type into the framework Web service handler 400.

All client applications 410 communicate with data sources/providers (e.g., data providers 435 and 437) through the framework web service handler 400 on a set of standard interfaces (methods) which in turn are conveyed over a standard communication protocol. The well-known SOAP (simple object access protocol) standard is an exemplary choice for a standard communication protocol between client 410 and the framework web service handler 400. SOAP may also be used for the framework web service handler 400 to data provider Web service handler communications. To leverage SOAP technology, available MICROSOFT COM components are used to parse SOAP messages. On the server side an ISAPI dll is implemented on the framework web service handler 400 to handle all the SOAP requests from the clients 410, to process and dispatch requests to the data provider web services. The session item and dispatcher classes implemented within the framework web service handler 400, and the connection and command classes of clients 410, are discussed further herein below.

In an alternative embodiment of the invention discussed hereinabove with reference to FIG. 12, data sources and their associated handlers are identified within the data provider registry 420 according to an XML schema summarized in FIG. 13. An ID field 450 stores a unique number for each data provider/handler. This is a system-generated number that is assigned when the data provider/handler record is created and stored within the data provider registry 420. A name field 452 holds the name of the data provider and is designated during configuration by the submitter of the new data provider record (e.g., SQL Provider, Alarm Provider). A description field 454 holds the description of the data provider and is also designated by the author of the data provider record. A WSDL field 456 holds a value designating a location of the Web Service Definition Language file that describes the interface/methods for the data handler associated with this particular data source. An Extended WSDL field 458 holds supporting information for the WSDL referenced in the WSDL field 456. A connection string field 460 holds particular information to facilitate making a connection to the data handler through which the identified data provider furnishes information. The connection string field 460 holds, for example, initial parameters, username, password, etc.

Figures 13, 14:
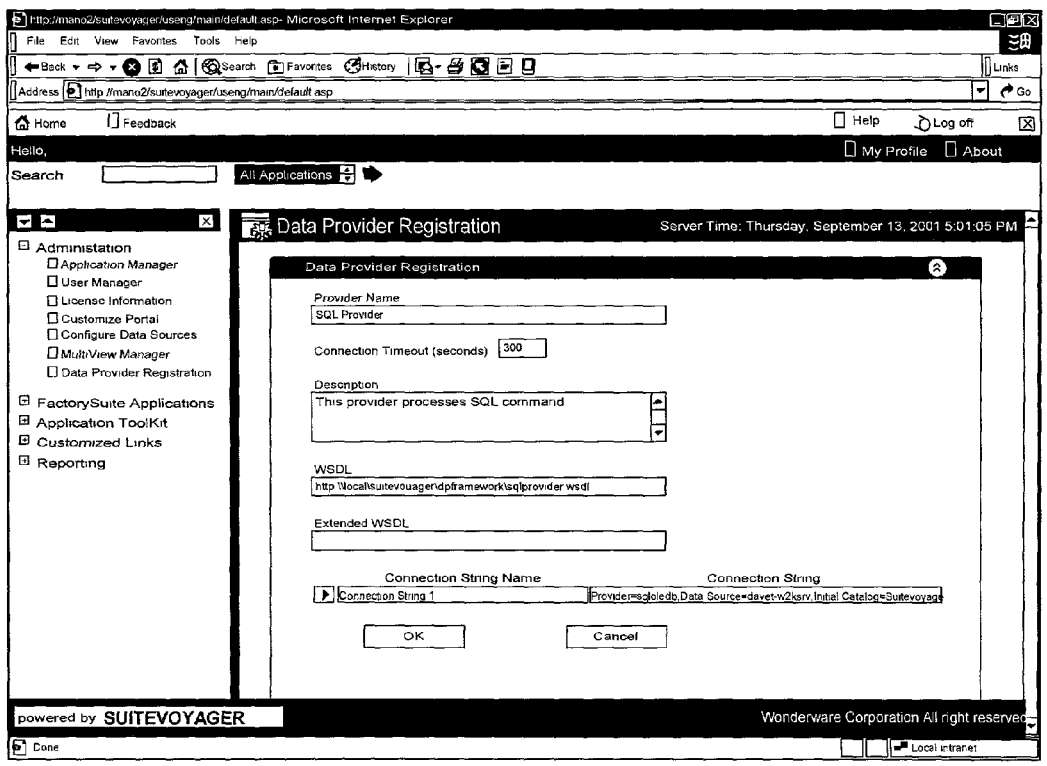
FIG. 13 is a block diagram of an XML schema listing data sources and their associated handlers within a data provider registry.
FIGS. 14 and 15 are screen shots of an exemplary GUI for registering a data provider.
Figure 15:
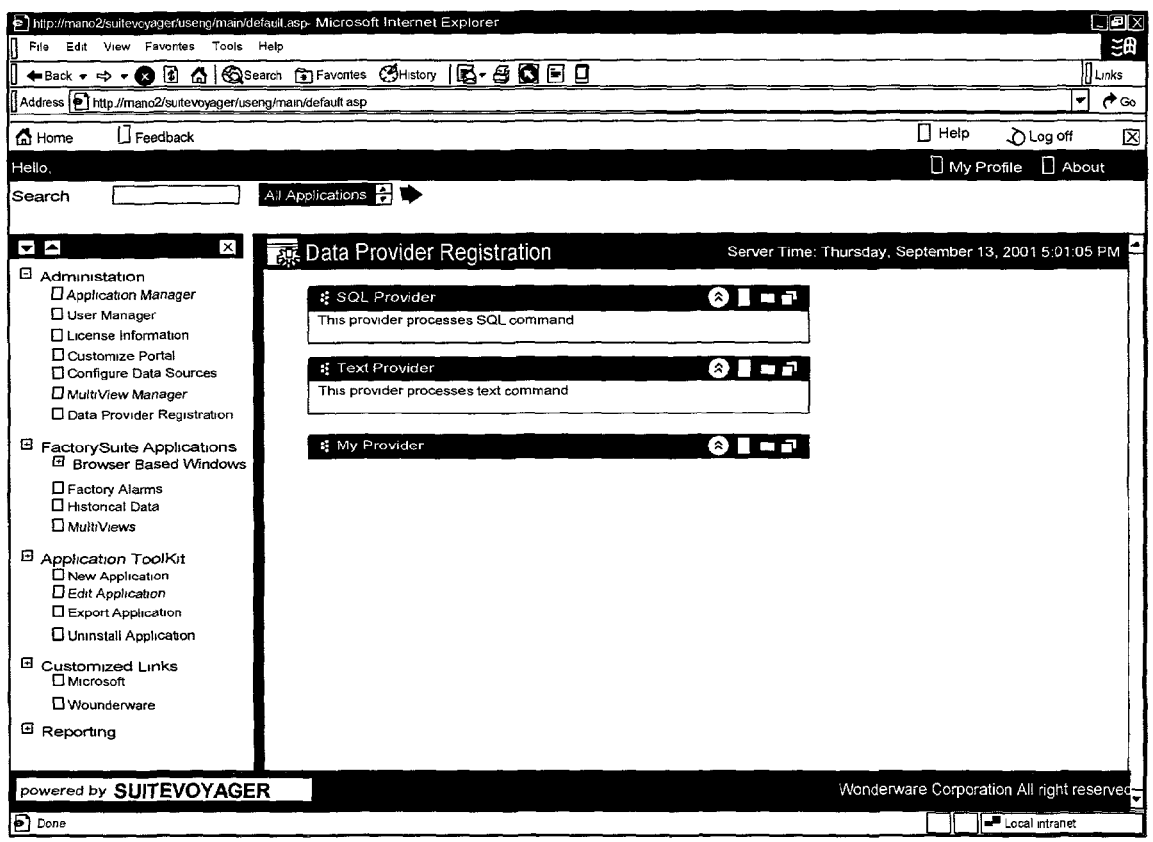

Having described exemplary fields for a data provider record, attention is directed to FIGS. 14 and 15 wherein exemplary GUI displays are provided for a data provider to register with the framework web service handler 400. When a data provider is implemented (potentially by a third party), steps are taken to expose the data provider to the clients 410 via the framework web service handler 400. This is accomplished through registration of the data provider with the framework web service handler 400. Basically, the framework web service handler 400 provides a page supporting registration to populate the fields of the schema summarized in FIG. 13. By way of example, the "new provider" enters the name of the data provider, a description identifying the type of provider, a URL to the provider Web Service Description Language, connection string, etc. Turning to FIG. 15, one of the primary differences between the enhanced system registration process and the one set forth above with reference to FIGS. 3 and 4 is the ability of a provider to designate a new data type handler during the data provider registration. This is accomplished by selecting the "My Provider" option on the opening data registration GUI display set forth in FIG. 15. Once registered with the framework web service handler 400 (the portal server), the data provider information is furnished to clients 410 when the clients invoke a BrowseDS method which retrieves and displays data sources.

Turning to FIGS. 16 and 17, a set of method calls are incorporated into a connection object 500 and command object 520. In an embodiment of the invention, the browser clients 410 provide COM wrappers that abstract the applications from SOAP implementation. The wrappers expose simple interfaces allowing client applications 410 to communicate with the framework web service handler 400 and data providers via the data provider web service handlers. The connection object 500 and command object 520 are such wrappers. The method calls identified for each are discussed further herein below with reference to the browser client interface supported by the framework web service handler 400.

Turning now to FIG. 18, a set of methods are identified that are supported by the framework web service handler 400. A browseDS method 550 is called by the clients 410 requesting enumeration of the data sources presently supported by the framework web service handler 400. A list is returned containing a set of available provider information. The set of provider information includes the content of the provider records described herein above with reference to FIG. 13. A connectDS method 552 is called by the clients 410 and returns a URL for a file (wwdbintf.wsdl) that describes all methods of the command object 520 that the data provider supports. A closeDS method 554 is called by the clients 410 to close a connection between a calling client and the framework handler 400.

Figure 19:
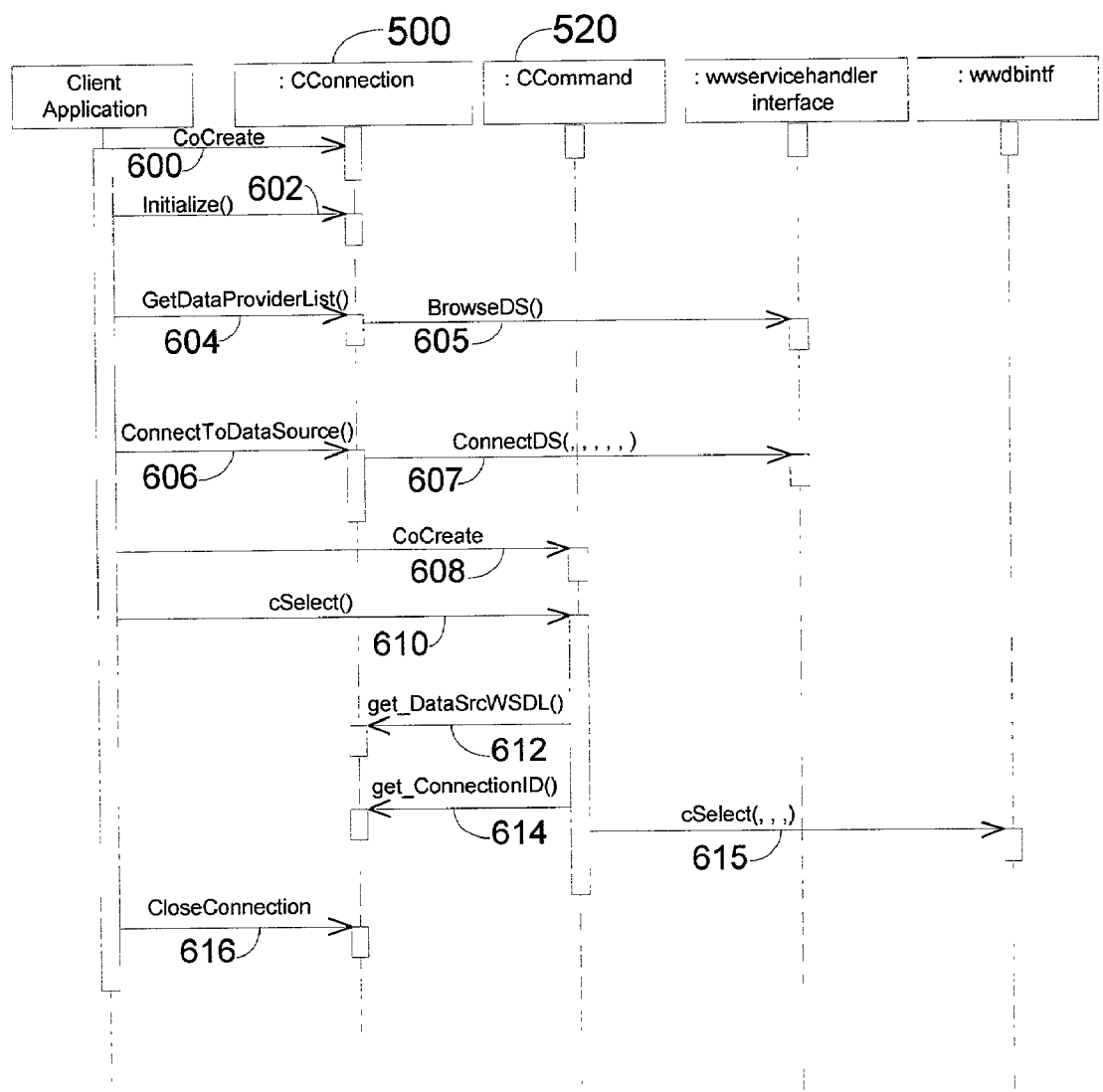
FIG. 19 is a sequence diagram depicting an exemplary set of steps executed between clients and a framework Web service handler during the course of a user session.

Turning to FIG. 19, a sequence diagram depicts an exemplary set of steps executed between the clients 410 and the framework web service handler 400 during the course of a user session. At step 600 the client application issues a "CoCreate" request to instantiate the connection object 500. Thereafter, at step 602 the client application issues an initialize command to initialize the connection object 500. In particular, the client object creates and initializes the MICROSOFT SOAP object to handle SOAP requests. At step 604 the client issues a GetDataProviderList command to the connection object 500. The connection object during step 605 invokes the browseDS method 550 on the wwservicehandler interface of the framework web service handler 400. The framework handler 400 returns for display on the client application's user interface a list of available data providers.

After a user has selected a particular one of the available data providers, during step 606 the client application issues a ConnectToDataSource command to the connection object 500. Next, during step 607 the connection object 500 issues a connect request to the wwservicehandler interface. The connection request includes parameters identifying the data source to which the client application wishes to establish a connection.

After establishing a connection, the client application issues a CoCreate command during step 608 to instantiate the command object 520. Thereafter, at step 610 the client application issues a cSelect call to the command object 520 to retrieve a record set from the previously selected data provider (source). In the exemplary embodiment the recipient of the request is a SQL provider.

At step 612, the command object 520 invokes the get_DataSrcWSDL method on the connection object 500 to obtain the language definitions for communicating with the selected data source. Thereafter, at step 614 the command object 520 invokes the get_ConnectionID method on the connection object (which in turn calls ConnectDS) to obtain the connection ID used to fill an ID parameter when making calls to the framework web service handler 400. Thereafter, during step 615 the command object 520 issues requests on behalf of the client application on an established connection to the selected data provider.

After completing a session, at step 616 the client application issues a CloseConnection command to the connection object 500. The above sequence of steps is intended to provide an exemplary use of the methods supported by the connection object 500 and command object 520. Those skilled in the art will readily appreciate that both the supported methods and the sequence of steps disclosed in FIGS. 16, 17, 18, and 19 are exemplary and that a variety of alternatives are contemplated in other embodiments of an extensible manufacturing/process control portal server system incorporating the present invention.

Having described a client application-side connection architecture in accordance with an alternative version of a manufacturing/process control portal server embodying the present invention, attention is now directed to the data-provider interface of the portal server architecture. Turning to FIG. 20, a set of interfaces are identified with associated methods supported by the interfaces. The framework web service handler 400, in an embodiment of the present invention, is an ISAPI dynamically linked library that intercepts and processes all requests from the client 410. For each request intercepted by a ccDataMarshaller class 620, a dispatcher class 622 and a sessionItem class 624 implemented by the framework handler 400 process and then dispatch the request to a particular data provider handler.

FIG. 20 depicts an exemplary relationship between these three object classes within the framework web service handler 400. The framework web service handler 400 includes a pool of worker threads to handle requests from clients. The CCDataMarshaller class 620 takes a message from a client and uses a well-known MICROSOFT SOAP READER component to parse the message and call the appropriate method in the Dispatcher class 622. Each connection to a data source will have a SessionItem class 624 to process and handle calls to a particular data provider. The SessionItem class 624 in turn calls an interface to the designated data provider.

FIG. 21 identifies a set of methods implemented within a data provider handler implementing the present invention. This interface definition represents an exemplary set of methods that are implemented upon data provider handlers to communicate with the framework web service handler 400 and respond to client requests passed by the framework web service handler 400 to the provider handlers. A data provider handler exposes the pSelect method 632 only if it is able to handle SQL statements. Otherwise the data provider handler exposes the pOpenRowSet method 634 which works with a single table at a time. The remaining methods are generally needed to implement any type of handler. The interface method specifications are provided herein below.

PConnect 630 is the first call the framework initiates to establish a connection with the provider.
pConnect([in] BSTR UserID, [in] BSTR Password, [in] BSTR
ConfigParmxml, [out, retval] int *ConnID)
   Parameters:
      UserID—User ID that provider needed for authentication
      Password—Password needed for authentication
      ConfigParmxml—Connection string. Provider will provide a mechanism to obtain from user
      ConnID—This ID will be used for all subsequent calls pertaining to this connection
Pselect 632 is called by the framework 400 to retrieve a record set. A provider should only expose this method if supports SQL commands.
pSelect([in] int ConnID, [in] BSTR Statement,[in] int MaxRecord, [out, retval] BSTR *xmlRowSet)
   Parameters:
      ConnID—Specify which connection to perform this operation
      Statement—SQL statement
      MaxRecord—0: framework only wants the schema back; −1: wants to get all rows; >0: wants certain number of records
      XmlRowSet—returned set of records in xml format
pOpenRowSet 634 is called by the framework to retrieve a record set. A provider exposes this method if it supports working with a single table.
pOpenRowSet([in] int ConnID, [in] BSTR xmlCondition, [in] int MaxRecord, [out,retval] BSTR *xmlRowSet)
   Parameters:
      ConnID—specify which connection
      xmlCondition—condition specifies how to return data in xml format
      MaxRecord—0: framework only wants the schema back; −1: wants to get all rows; >0: wants certain number of record
      XmlRowSet—returned set of records in xml format
PClose 636 closes a current row set.
pClose([in] int ConnID)
PDelete 638 deletes a record in a current record set.
pDelete([in] int ConnID, [in] BSTR xmlCondition)
   Parameters:
      ConnID—Specify which connection
      XmlCondition—Specify how to delete a record in current record set. Data in xml format.
PInsert 640 inserts a record into a currently open record set.
pInsert([in] int ConnID, [in] BSTR xmlCondition)
   Parameters:
      ConnID—Specify which connection
      XmlCondition—Specify how to update a record in xml format
PNextRecordSet 642 retrieves a next set of records.

pNextRecordSet([in] int ConnID, [in] int MaxRecord, [out, retval] BSTR *xmlRowSet)
    Parameters:
        ConnID—Specify which connection
        MaxRecord—maximum number of records framework will accept
        XmlRowSet—returned set of records in xml format
PUpdate 644 updates a record in a currently open record set.
pUpdate([in] int ConnID, [in] BSTR xmlCondition)
    Parameters:
        ConnID—Specify which connection
        XmlCondition—Specify how to update a record in xml format.
PPreviousRecordSet 646 retrieves a previous record set.
pPreviousRecordSet([in] int ConnID, [in] int MaxRecord, [out,retval] BSTR *xmlRowSet)
    Parameters:
        ConnID—Specify which connection
        MaxRecord—maximum number of records framework will accept.
        XmlRowSet—returned set of records in xml format
PFirstRecordSet 648 retrieves the first record set.
pFirstRecordSet([in] int ConnID, [in] int MaxRecord, [out, retval] BSTR *xmlRowSetl)
    Parameters:
        ConnID—Specify which connection
        MaxRecord—maximum number of records framework will accept
        XmlRowSet—returned set of records in xml format
PLastRecordSet 650 retrieves the last record set.
pLastRecordSet([in] int ConnID, [in] int MaxRecord, [out, retval] BSTR *xmlRowSetl)
    Parameters:
        ConnID—Specify which connection
        MaxRecord—maximum number of records framework will accept
        XmlRowSet—returned set of records in xml format
PDisconnect 652 releases a connection.
    pDisconnect([in] int ConnID)

In the above set of exemplary interface methods, it is noted that the pSelect, pNextRecordSet, pOpenRowSet, pFirstRecordSet, pLastRecordSet, and pPreviousRecordSet methods are expected to return a rowset in XML format. The following represents an exemplary XML schema for returning XML rowset data.

```
<xml xmlns:s="ww-dataprovider-schema"
xmlns:dt="ww-datatype-definition"
xmlns:rs="urn:schemas-wonderware-com:rowset"
xmlns:z="#RowsetSchema">
    <s:Schema id="RowsetSchema">
        <s:ElementType name="row" content="eltOnly">
            <s:AttributeType name="AppID" rs:number="1">
                <s:datatype dt:type="int" dt:maxLength="4"/>
            </s:AttributeType>
            <s:AttributeType name="Title" rs:number="2">
                <s:datatype dt:type="string" dt:maxLength="40"/>
            </s:AttributeType>
        </s:ElementType>
    </s:Schema>
    <rs:data>
        <z:row AppID="1" Title="Charting"/>
        <z:row AppID="2" Title="Reporting" />
        <z:row AppID="3" Title="Data Grid"/>
    </rs:data>
</xml>
```

The returned XML has two sections. The top section is a schema describing how the data is to be returned. Each attribute element represents a column and describes the column name and number. The sub-element describes the data type and the maximum length of the field. The bottom section is the actual data in the format defined by the schema. The row element has attributes specifying the name of the column, column number, data type, and the maximum length of the data field. Schema only need be returned in the pSelect or pOpenRowSet call. Subsequent calls such as pNextRecordSet only need to return the data. When there is no more data to return, the provider returns the following xml message.

```
<xml>
    <no-more-row/>
</xml>
```

Figure 22:
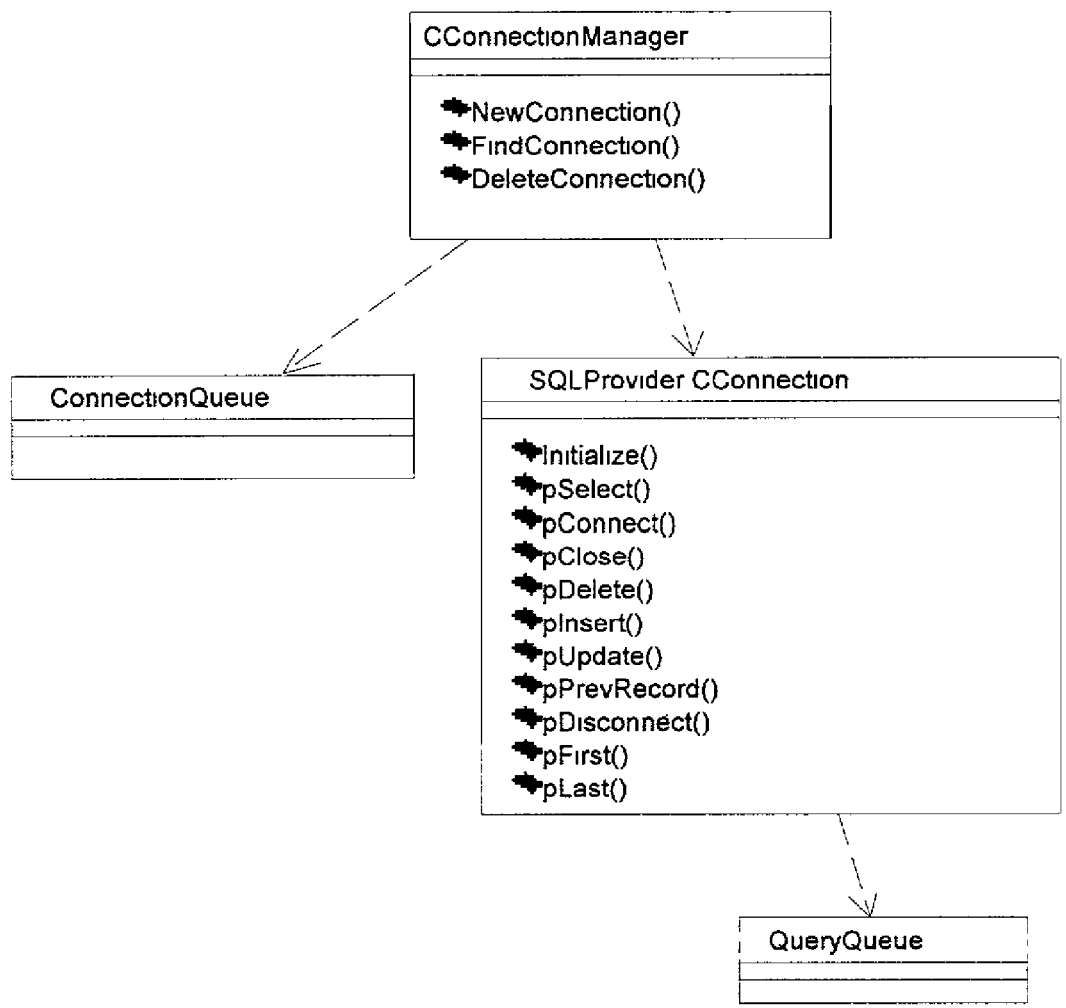
FIG. 22 is a block diagram showing an exemplary SQL provider handler class structure and the relationships among the classes in a COM component.

Turning now to FIG. 22, an exemplary SQL provider handler class structure is illustratively depicted. In an embodiment of the present invention a SQL Provider handler uses ADO to access a database. The SQL provider handler supports the pSelect and most of the above identified provider interface methods. However the SQL provider does not support the pOpenRowSet method. The SQL provider handler has an ASP page as its service handler that calls into a COM component. FIG. 22 depicts the relationship between classes in the COM component.

Illustrative embodiments of the present invention and certain variations thereof have been provided in the Figures and accompanying written description. The present invention is not intended to be limited to these embodiments. Rather the present invention is intended to cover the disclosed embodiments as well as others falling within the scope and spirit of the invention to the fullest extent permitted in view of this disclosure and the inventions defined by the claims appended herein below.

What is claimed is:

1. A customer-configurable plant process observation portal server system for collecting plant process information, in accordance with a user designated set of plant information sources, the plant information sources comprising process control equipment, and for disseminating the information to users via network connections, the system comprising:
    a portal server comprising:
        an extensible information source registry for storing at least identification information corresponding to an extensible set of plant information sources accessed via the portal server;
        a portal server data interface, accessible via remote networked stations, providing user access to plant information associated with the set of designated plant information sources;
        a portal configuration utility enabling a user to at least designate a new plant information source via a configuration interface, the new plant information source thereafter being added to the extensible set of plant information sources; and
    a data access subsystem, interposed via network links between the portal server data interface and the extensible set of plant information sources, and wherein data from the extensible set of plant information sources is stored within the data access subsystem prior to forwarding to portal users via the portal server data interface.

2. The portal server of claim 1 wherein the portal configuration utility further enables a user to designate a manner in which data from sources of information is visually depicted on a user interface rendered by the portal server for a particular portal site.

3. The portal server of claim 1 wherein the portal server comprises at least one association with an Internet portal site from which data received from plant information sources is accessed by users.

4. The portal server of claim 1 wherein the portal server comprises at least one association with an intranet portal site from which data received from plant information sources is accessed by users.

5. The portal server of claim 1 wherein the portal configuration utility further enables a user to designate a new data handler to be added to an extensible set of data handlers that process information of particular types provided by the extensible set of plant information sources.

6. The portal server of claim 1 wherein the portal configuration utility includes computer program instructions for rendering a configuration template prompting a user to provide information associated with the new plant information source.

7. The portal server of claim 6 wherein the configuration template comprises a Web page, and the portal configuration utility is accessible by a browser.

8. A customer-configurable plant process observation portal server system for collecting plant process information, including plant process information from process control equipment, in accordance with information source designations and for disseminating the information to users via network connections, the system comprising:
 a portal server comprising:
  an extensible set of data handlers for processing differing types of data from a set of plant information sources accessed via the portal server;
  a portal server data interface, accessible via remote networked stations, providing user access to plant information associated with the set of plant information sources;
  a portal configuration utility enabling a user to designate a new data handler via a configuration interface, the new data handler thereafter being added to the extensible set of data handlers; and
 a data access subsystem, interposed via network links between the portal server data interface and the extensible set of plant information sources, and wherein data from the extensible set of plant information sources is stored within the data access subsystem prior to forwarding to portal users via the portal server data interface.

9. The portal server of claim 8 wherein the set of data handlers comprises a process history database handler.

10. The portal server of claim 8 wherein the set of data handlers comprises an alarm handler.

11. The portal server of claim 8 wherein the set of data handlers comprises a data exchange protocol-specific handler.

12. The portal server of claim 8 wherein the set of data handlers comprises a data handler for processing data from a controller, thereby facilitating accessing data generated by multiple controllers via a single physical node on a process control network.

13. A customer-configurable plant process observation portal server system for collecting plant process information, including plant process information from process control equipment, in accordance with user specified information source designations and for disseminating the information to users via network connections, the system comprising:
 a portal server comprising:
  an extensible information source registry for storing at least identification information corresponding to an extensible set of plant information sources accessed via the portal server;
  a user-configurable portal server data interface, accessible via remote networked stations, providing user access to plant information represented in the extensible set of plant information sources;
  a portal data interface configuration utility enabling a user to at least designate, via a configuration interface, a new user interface display element for presenting plant process information, the new user interface display element thereafter being added to the extensible set of plant information sources; and
 a data access subsystem, interposed via network links between the portal server data interface and the extensible set of plant information sources, and wherein data from the extensible set of plant information sources is stored within the data access subsystem prior to forwarding to portal users via the portal server data interface.

14. A method for facilitating configuring a customer-configurable plant process observation portal server system to collect plant process information in accordance with user-specified plant information sources, the plant information sources comprising process control equipment, the method comprising the steps of:
 creating an extensible information source registry for storing at least identification information corresponding to an extensible set of plant information sources accessed via the portal server;
 generating a portal server data interface, accessible via remote networked stations, providing user access to plant information represented in the extensible set of plant information sources;
 providing a portal configuration utility enabling a user to at least designate a new plant information source via a configuration interface, the new plant information source thereafter being added to the extensible set of plant information sources; and
 providing a data access subsystem, interposed via network links between the portal server data interface and the extensible set of plant information sources, and wherein data from the extensible set of plant information sources is stored within the data access subsystem prior to forwarding to portal users via the portal server data interface.

15. A method for configuring a plant process observation portal site, supported by a portal server system, to extend a set of plant information sources associated with the portal site, the plant information sources comprising process control equipment, the method comprising the steps of:
 accessing, via a browser, a configuration page associated with the portal site;
 first specifying, via a graphical user interface, a new source of plant information accessed via the portal server;
 second specifying, via the graphical user interface, how information associated with the new source of plant information is visually rendered on visual displays associated with the plant process observation portal site; and
 providing a data access subsystem, interposed via network links between the portal server data interface and the extensible set of plant information sources, and wherein data from the extensible set of plant information sources is stored within the data access subsystem prior to forwarding to portal users via the portal server data interface.

16. The portal server of claim 1 further comprising:
a plurality of data handlers that process information of particular types provided by the extensible set of plant information sources.

17. The portal server of claim 16 wherein the plurality of data handlers comprises a process history database handler.

18. The portal server of claim 16 wherein the plurality of data handlers comprises an alarm handler.

19. The portal server of claim 16 wherein the plurality of data handlers comprises a data exchange protocol-specific handler.

20. The portal server of claim 1 wherein the extensible source registry facilitates storing plant information provided by multiple controllers, thereby facilitating accessing data generated by multiple controllers via a single physical node on a process control network.

* * * * *